United States Patent Office 3,645,905
Patented Feb. 29, 1972

3,645,905
CORROSION INHIBITED MULTI-PURPOSE
METAL CLEANER
Myer Rosenfeld, Baltimore, and Troy R. Nichols, Bel
Air, Md., assignors to the United States of America as
represented by the Secretary of the Army
No Drawing. Filed Dec. 1, 1969, Ser. No. 881,305
Int. Cl. C09d 9/04; C11d 3/08; C23f 11/06
U.S. Cl. 252—540
8 Claims

ABSTRACT OF THE DISCLOSURE

A multi-purpose cleaner comprising sodium metasilicate, dodecyl benzene sodium sulfonate, and a nonionic surfactant in combination with a metal corrosion inhibitor consisting of sodium or potassium stannate.

The invention described herein may be manufactured, used, and licensed by or for the Government for governmental purposes without the payment to us of any royalty thereon.

This invention relates to a multi-purpose composition having utility as an alkaline metal cleaner, a paint stripper or to loosen carbon residing on the surface of pistons. More particularly, it relates to an alkaline composition having therein a small amount of sodium or potassium stannate in order to inhibit the corrosion of aluminum or alloys thereof.

Sodium or potassium chromates are usually utilized in paint removing formulations to inhibit the corrosion of the metal. However, the disopsal of waste chromates constitutes a problem in that soluble chromates are poisonous. Accordingly, many municipalities severely limit the chromium concentration permitted to enter effluent streams or waterways. The allowable hexavalent chromium concentrate suggested by the U.S. Public Health Service for the protection of fish is 0.50 milligram per liter for industrial waste effluent after mixing with receiving water. Therefore, it is often necessary to dilute the waste containing chromate to a permissible level prior to discharging into effluent streams and waterways. When appreciable concentrations of chromates are needed for corrosion inhibition, this becomes a lengthy operation.

It is an object of this invention to provide and disclose a multi-purpose composition.

It is a further object of this invention to provide and disclose a multi-purpose composition having a corrosion inhibitor incorporated therein.

It is a further object of this invention to provide and disclose a composition comprising a corrosion inhibitor which is effective in the protection of aluminum and alloys thereof.

It is a further object of this invention to provide and disclose a composition which will obviate the need for the treatment of the cleaning solution prior to the disposition thereof into effluent streams or waterways.

Other objects and a fuller understanding of the invention may be had by referring to the following description and claims.

The multi-purpose composition comprises an alkaline composition consisting of sodium silicate, wherein the sodium metasilicate calculated as anhydrous comprises 57.8 to 73% sodium silicate by weight; dodecylbenzene sodium sulfonate in an amount of 17.0 to 29.8% by weight calculated on the basis of 86% active material and an nonionic surfactant comprising between 7.36 to 12.5% by weight. The nonionic surfactant may be a branched or straight chain nonylphenol containing a side chain of 15 ethylene oxide units. In the alternative, the nonionic surfactant may be a branched or straight chain octylphenol containing a side chain of 9 to 10 ethylene oxide units. In an alkaline medium of the present type, the attack on ferrous or magnesium metals is negligible, therefore, no corrosion inhibitor is essential. However, in the treatment of aluminum or alloys thereof, a corrosion inhibitor is essential to prevent corrosion of the metal. The present invention utilizes sodium and potassium stannate. Sodium stannate, calculated as anhydrous, is effective when utilized in the composition in an amount of from 0.72 to 7.5% by weight. Potassium stannate is effective when utilized in an amount of from 0.87 to 7.5% by weight.

The present composition was evaluated in regards to its paint removing ability utilizing 2S aluminum, i.e., aluminum alloy SAE–AA1100, panels having dimensions of 1″ by 3″ and a thickness of 0.034. Sharp edges were removed with 4/0–150 Alundum polishing paper. The aluminum panels were immersed for 5 minutes in an 8 ounce per gallon aqueous solution of trisodium phosphate at 180° F., water rinsed, dipped into 50% nitric acid for a period of 30 seconds, and water rinsed. The panels were then immersed for a period of 5 minutes in an aqueous bath at room temperature containng one ounce per gallon of a composition consisting of 20% ammonium bifluoride and 80% chromium trioxide by weight. The panels were then removed, water rinsed, air dried.

The multi-purpose compositions were evaluated utilizing the paint systems set forth in Table I below: The paint, which consisted of an olive-drab color, was applied by spray to one side of each panel. A coat comprising a dry film of paint having a thickness of 0.7 to 1.0 mm. was deposited on one side of each panel.

TABLE I

Systems:
1 ____ One coat alkyd enamel baked for 30 minutes at 300° R., air dried for 24 hours, then aged for 24 hours at 120° F.
2 ____ One coat alkyd enamel modified with 20% urea-formaldehyde, baked for 30 minutes at 300° F., air dried for 24 hours, then aged for 24 hours at 120° F.
3 ____ One coat alkyd-red iron oxide-zinc chromate baked for 30 minutes at 300° F., cooled to room temperautre, and followed by one coat alkyd lusterless enamel baked for 30 minutes at 300° F., air dried for 24 hours, then aged for 24 hours at 120° F.
4 ____ One coat alkyd nitrocellulose lacquer air dried for 24 hours, then aged for 24 hours at 120° F.

The composition was evaluated in regards to its cleaning ability utilizing test panels of SAE-1020, 20 gage, cold-worked steel having dimensions 2½" by 2½". Sharp edges of the panels were smoothed and the faces polished with No. 1 coarse emery cloth. The panels were then swabbed with acetone, using absorbent cotton, dipped into absolute alcohol and air dried.

Two cleaning evaluations were conducted. One utilized steel panels coated with a mineral oil. The mineral oil utilized was Military Symbol oil 3065 conforming to MIL-L-15016. The cleaned panel was suspended from a hook and dipped into a 400 ml. beaker containing about 300 ml. of the oil at 26°±1° C., removed and allowed to drain for 30 minutes. Adhering oil was approximately 0.16 gm.

The other cleaning evaluation utilized steel panels coated with asphalt. Petroleum asphalt conforming to SS-A-706, grade 85-100, was used. The soil was heated to approximately 50° C. and spread evenly over one face of the cleaned test panels. Between 0.32 to 0.34 gram was applied to each panel.

In addition, the compound was evaluated in regards to its ability to inhibit the corrosion of aluminum panels. Four panels cut from 2S aluminum sheets were utilized in each determination and an average figure obtained. The test panels utilized measure ¾" by 3" and have a thickness of approximately 0.03". The panels were lightly polished with No. 150 Alundum paper, washed with acetone, wiped with paper toweling, dipped into absolute ethyl alcohol and again wiped with paper toweling. After being weighed to 0.0001 gram, the test panels were immersed in the boiling test solution for one hour. They were then removed, rinsed under flowing tap water, dipped into absolute ethyl alcohol and dried with paper toweling. To remove any residual film that had formed during the test, the panels were immersed in concentrated nitric acid at room temperature for a period of two minutes. The panels were then rinsed thoroughly under flowing tap water, dipped into absolute ethyl alcohol, dried with paper toweling and weighed to 0.0001 gram. The difference in weight of the panels after treatment represents loss due to corrosion. It was found that the average weight loss due to the treatment of the panels with nitric acid after immersion of the panels in the aqueous formulation was around 0.05 mg.

In addition, the present composition was evaluated for its ability to loosen carbon residing on the surface of aluminum pistons of an internal combustion engine. The pistons were immersed in a boiling aqueous solution of the present composition for a period of two hours. The pistons were then removed and scrubbed with a hard bristle brush under running cold water.

Set forth in Table II following are the results obtained from the evaluation of the present aqueous composition in regard to its alkaline cleaning, paint stripping and aluminum pistons cleaning abilities.

The steel panels which were contaminated with the mineral oil, were cleaned by immersion in the aqueous cleaning solution for a period of 3 minutes. The panels were then rinsed and examined for the presence of a water break. In Table II, the mineral oil test is designated "S" for satisfactory if there is no water break apparent on the surfaces of the rinsed steel panels.

In regards to the steel panels contaminated with the asphalt soil, the time required for the complete removal of the asphalt was noted as set forth in said Table II. A time of less than 13 minutes for the complete removal of the asphalt soil is considered satisfactory.

Table II discloses that the effective amount of sodium stannate is in the range of 0.82 to 7.49 percent by weight as shown in formulations 11 to 15. Potassium stannate has utility in the range of 0.88 to 7.48 percent by weight as shown by formulations 1 to 8. Formulation 20 discloses that a composition containing 35.55 percent potassium chromate by weight therein is needed in order to provide 90.91% corrosion inhibition. This compares, for example, with 0.88 percent potassium stannate required to achieve 95.15% corrosion inhibition. The amount of potassium chromate necessary to provide effective corrosion inhibition would present a disposal problem.

Although we have described our invention with a certain degree of particularity, we wish it to be understood that we do not desire to be limited to the exact details of formulations shown and described, for obvious modification will occur to a person skilled in the art.

Having described our invention, we claim:

1. A multi-purpose cleaner composition consisting of 57.8 to 73 percent sodium metasilicate, 17 to 30 percent dodecylbenzene sodium sulfonate, a nonionic surfactant, in an amount of 7.36 to 12.5 percent, selected from the group consisting of nonyl phenol having a side chain of 15 ethylene oxide units and octyl phenol having a side chain of 9 to 10 ethylene oxide units, in combination with a corrosion inhibitor selected from the group consisting of sodium stannate in an amount of 0.82 to 7.49 percent and potassium stannate in an amount of 0.87 to 7.49 percent by weight.

2. An aqueous solution of the composition of claim 1 containing about 2.045 to about 2.580 grams of composition per 100 milliliters of solution.

3. A multi-purpose cleaner composition in accordance with claim 1 wherein the nonionic surfactant is nonyl phenol having a side chain of 15 ethylene oxide units.

4. A multi-purpose cleaner composition in accordance with claim 1 wherein the nonionic surfactant is octyl phenol having a side chain of 9 to 10 ethylene oxide units.

5. A multi-purpose cleaner composition in accordance with claim 1 consisting of:

| Ingredients: | Percent by wt. |
|---|---|
| Sodium metasilicate | 72.97 |
| Dodecylbenzene sodium sulfonate | 18.24 |
| Nonionic surfactant | 7.88 |
| Sodium stannate | 0.91 |

6. A multi-purpose cleaner composition in accordance with claim 1 consisting of:

| Ingredients: | Percent by wt. |
|---|---|
| Sodium metasilicate | 72.86 |
| Dodecylbenzene sodium sulfonate | 18.22 |
| Nonionic surfactant | 8.01 |
| Potassium stannate | 0.91 |

7. A multi-purpose cleaner composition in accordance with claim 1 consisting of:

| Ingredients: | Percent by wt. |
|---|---|
| Sodium metasilicate | 69.78 |
| Dodecylbenzene sodium sulfonate | 17.45 |
| Nonionic surfactant | 7.54 |
| Sodium stannate | 5.23 |

8. A multi-purpose cleaner composition in accordance with claim 1 consisting of:

| Ingredients: | Percent by wt. |
|---|---|
| Sodium metasilicate | 68.03 |
| Dodecylbenzene sodium sulfonate | 17.01 |
| Nonionic surfactant | 7.48 |
| Potassium stannate | 7.48 |

References Cited

UNITED STATES PATENTS

| | | | |
|---|---|---|---|
| 3,034,210 | 5/1962 | De Long | 252—389 X |
| 2,975,140 | 3/1961 | Yaroch | 252—110 |
| 2,947,639 | 8/1960 | Balden | 117—130 X |
| 2,898,246 | 8/1959 | Hannah | 252—156 X |
| 2,822,325 | 2/1958 | Tinnon et al. | 204—54 L X |
| 2,614,992 | 10/1952 | Mankowich | 252—137 |
| 1,939,421 | 12/1933 | Tosterud | 148—6.27 X |

OTHER REFERENCES

McCutcheon's Detergents and Emulsifiers, 1967, Annual, pp. 31, 155, 156 and 262.

Protective Coatings for Metals, by R. M. Burns and W. W. Bradley, 1955, pp. 156 and 165.

LEON D. ROSDOL, Primary Examiner

D. L. ALBRECHT, Assistant Examiner

U.S. Cl. X.R.

252—135, 387, 389, 539